United States Patent [19]
Johnson

[11] Patent Number: 4,809,146

[45] Date of Patent: * Feb. 28, 1989

[54] ENCLOSURE WITH INTERLOCKING FRAME JOINTS

[76] Inventor: David W. Johnson, 1884 Sunset Blvd., San Diego, Calif. 92103

[*] Notice: The portion of the term of this patent subsequent to Dec. 29, 2004 has been disclaimed.

[21] Appl. No.: 137,101

[22] Filed: Dec. 23, 1987

Related U.S. Application Data

[63] Continuation-in-part of Ser. No. 848,573, Apr. 7, 1986, Pat. No. 4,715,503.

[51] Int. Cl.⁴ .............................................. F21L 7/00
[52] U.S. Cl. ................................. 362/367; 211/189; 312/263
[58] Field of Search .................. 211/74, 189, 105, 85, 211/182, 126; 403/219, 364; 446/106; 273/160; 52/667; D6/467; D7/71; 217/45, 13; 312/263; 362/367

[56] References Cited

U.S. PATENT DOCUMENTS

| | | | |
|---|---|---|---|
| 1,636,607 | 7/1927 | Horton | 217/45 X |
| 3,218,446 | 11/1965 | Langer | 362/267 X |
| 4,715,503 | 12/1987 | Johnson | 211/74 |

Primary Examiner—Blair M. Johnson
Attorney, Agent, or Firm—Ralph S. Branscomb

[57] ABSTRACT

A multi-purpose enclosure is defined by the use of a frame made up of 24 very similar structural members that are carefully notched so that they interlock at the corners to define a joint without the use of any fasteners or adhesive. When properly done, the 24 elongated members which define the joints also define, at each joint, a three-sided inside corner so that there are eight inside corners, one at each joint, which in the preferred embodiment define a cube. Each combination of four inside corners which defines a quadrilateral plane which is orthogonal to one of the three main X, Y, or Z axes of the enclosure seats a panel, in the preferred embodiment, so that a six-sided paneled enclosure is formed for a multitude of uses, a lamp being shown as one example in this disclosure.

15 Claims, 3 Drawing Sheets

U.S. Patent  Feb. 28, 1989  Sheet 1 of 3  4,809,146
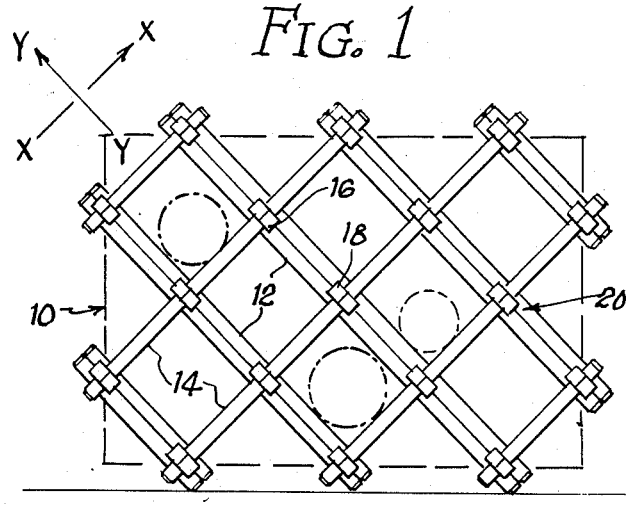
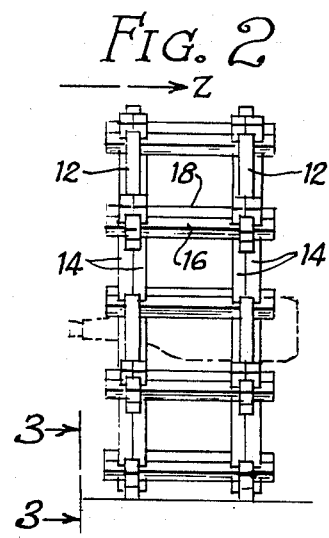
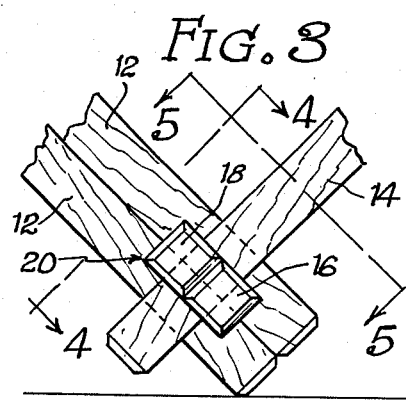
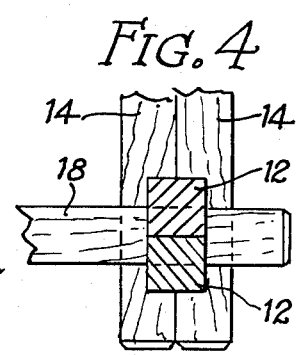
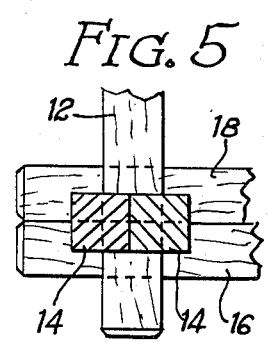
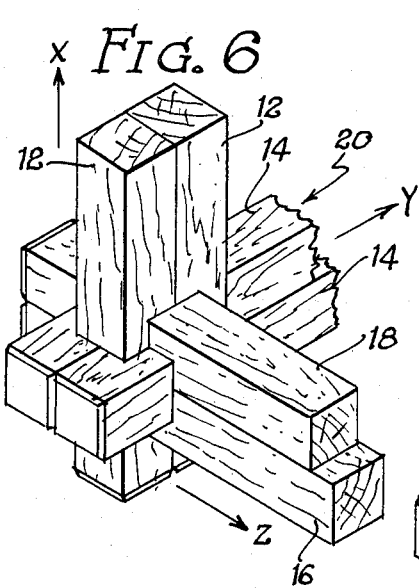
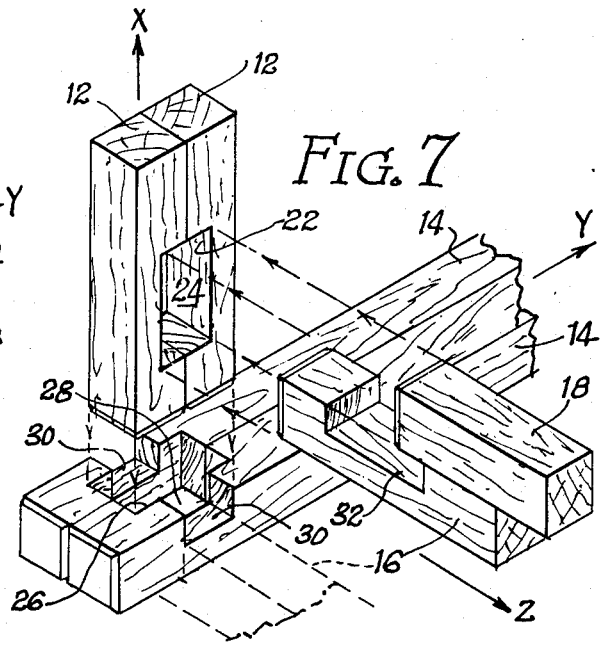

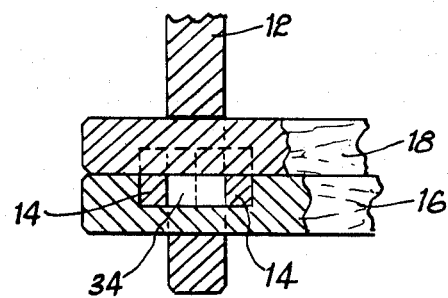
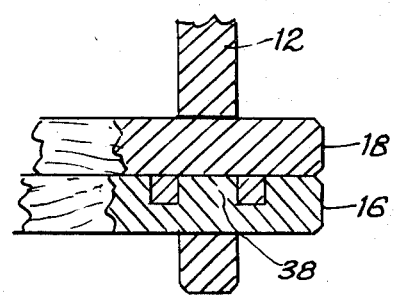
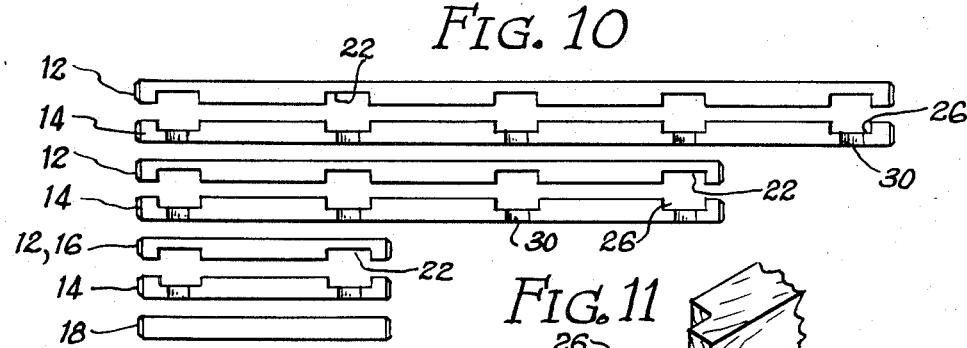
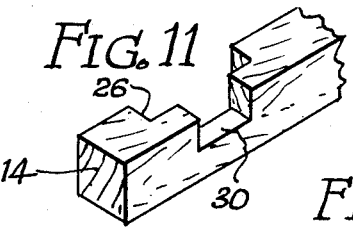
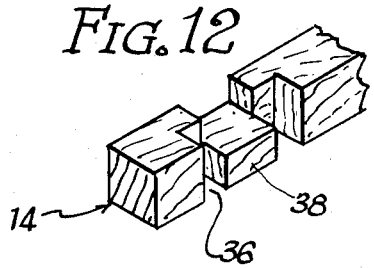
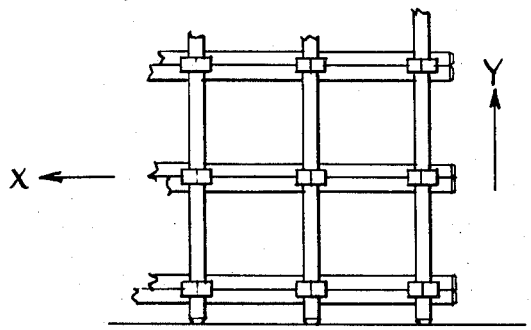

ENCLOSURE WITH INTERLOCKING FRAME JOINTS

BACKGROUND OF THE INVENTION

The instant invention is a continuation in part application of application Ser. No. 848,573, filed 04/07/86, which issued into U.S. Pat. No. 4,715,503, issued Dec. 29, 1987, to David W. Johnson, the same inventor as the instant application, on an INTERLOCKING JOINT WINE RACK.

The parent application to the instant application set forth a basic configuration of elongated structural members which could be used to create miscellaneous figures, a wine rack being the one that was emphasized and claimed specifically.

Whereas it was mentioned that the frame which was used to create the wine rack could also be used to define a frame for an enclosure, no enclosure was detailed or claimed in that application, and it is this application in which such enclosure is, in fact, detailed, illustrated and claimed.

The frame of the instant application, as well as the frame of the wine rack in the patent application, is formed by elongated members, such as wood, plastic or metal, which are of identical cross-sectional dimension in the preferred embodiment. These members are in turn notched in a specific fashion, there being three different notch patterns including no notch at all, and the notch patterns are interlocked to define the joints of the structure.

SUMMARY OF THE INVENTION

The instant invention takes off where the prior art stopped, and sets forth specifically the nature of an enclosure created by an eight-cornered parallelepiped structure in which each of the corners is defined by an interlocking configuration with no fasteners or adhesives.

In the preferred embodiment, each of the sides is identical to the others for simplicity of illustration, although the nature of the enclosure can be preserved with the X-, Y-, and Z-dimensions being independent of one another so that a variety of parallelepipeds could be created.

When made according to the construction that is detailed herein, each of the corners of the invention defines a three-dimensional inside corner, such that each inside corner will seat the three intersecting panels that would meet to define a corner of an enclosed cube.

When the frame is cube-shaped as illustrated, the panels which fit inside of the frame and seat in the three-dimensional inside corners can all be identically shaped, being almost square, but deviating from square in that they are two panel thicknesses longer than they are wide. When these panels are inserted inside the cube, each panel overlaps two other panels at its ends, and in turn is overlapped by two other panels at its sides, so that not only is each panel identical to every other panel in planform dimension as well as thickness, but they work together to hold all the panels in place as they are assembled within the frame. As it turns out, the removal of one of the elongated members which defines the frame will permit one of the panels to be removed to get at the inside of the container, such as to change a light bulb in the illustrated embodiment of the lamp. Also, the removal of one elongated member to permit the removal of a single panel will permit the removal, or the reconfiguration of all of the other panels, which are again held securely in place upon the reinsertion of the single elongated member whose removal permitted the panels to be removed and rearranged.

DESCRIPTION OF THE DRAWINGS

FIG. 1 is a front elevation view of a wine rack made from the lattice construction;

FIG. 2 is a side elevational view of the wine rack of FIG. 1 illustrating a bottle of wine as it would rest in the rack;

FIG. 3 is a front elevational view of a typical bottom joint of the rack and of the lattice in general;

FIGS. 4 and 5 are sections taken respectively along lines 4—4 and 5—5 of FIG. 3;

FIG. 6 is an isometric view of a typical joint;

FIG. 7 is an exploded view of the joint illustrated in FIG. 6 making it possible to understand how the members interlock to form the joint;

FIG. 8 illustrates the internal void of the joint utilizing the preferred method of construction;

FIG. 9 is identical to FIG. 8, illustrating the way in which the internal void is filled by utilizing slats of the modified version illustrated in FIG. 12;

FIG. 10 is a plan view illustrating the three different sizes and types o used in construction of the wine rack;

FIG. 11 is an isometric view of the notched area of a typical slat;.

FIG. 12 is an isometric view of a modified slat with an E-type configuration so that the internal void of the joint is filled as shown in FIG. 9;

FIG. 13 illustrates the lattice construction as it would appear if it were not rotated 45 degrees as illustrated in FIG. 1 for a wine rack;

DETAILED DESCRIPTION OF THE PREFERRED EMBODIMENT

Figure 14:
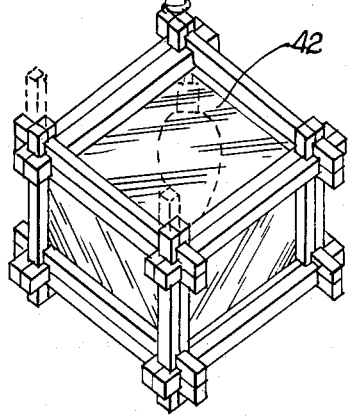
FIG. 14 is an isometric view of the enclosure of the instant invention when used to define a hanging lamp.

The three dimensional lattice is best understood by labeling the directions in which the various members extend in a wine rack, so as indicated in FIG. 1, the X and Y axes align with the directions that the members extend that define the front of the wine rack, and the depth is established by the Z direction, indicated in FIG. 2. The same type of construction could clearly be used in a similar structure illustrated in FIG. 13 as it generally would be when used as a structural member, in which the matrix is upright, rather than being tilted 45 degrees as in FIG. 1. The configuration of the wine rack of FIGS. 1 and 2, is such that, as it is made tilted 45 degrees from the upright as shown in FIG. 12, all peripheral joints of the wine rack align with the sided of the rectangle, illustrated in part at 10.

The lattice of the rack is defined from only four different types of members. Although they are all similar pieces of hardwood rectangular millstock in the preferred embodiment, sanded, polished and finished to produce a fine piece of furniture, in order to clarify the explanation and description, the members are given arbitrary distinguishing names which correspond with the above-mentioned directions in three dimensions in which the members run. Members running in the X direction are called "laths," and are indicated at 12, "slats" 14 run in the Y direction, and "posts" 16 and 8 run in the Z direction (there are two different kinds of posts).

All of the joints 20 are identical, in the configuration, orientation and cutting of the members that define the joints. Thus, to understand the construction of the enclosure unit, first the construction of a single joint will be described, and then the organization of the lattice as illustrated in the open wine rack as a whole will be set forth, and then construction of the enclosure is described as it would appear implemented as a hanging lamp.

Turning to FIG. 7, the basic element of the X direction is the lath 12, and two of these laths together form the structural member that extends in the X direction. In the claims, the laths are defined as "elongated structural members," as are the slats.

The two laths in FIG. 7 each has what is referred to as a "full notch 22," this terminology referring to a notch, which when paired with an oppositely directed notch, as shown in FIG. 7 defines a passthrough opening 24 for a pair of members which will snugly fit into the opening when inserted orthogonally therethrough. This opening is referred to as a "Z-passthrough opening" in the claims, because the opening will pass through members which run in the Z direction.

Still referring to FIG. 7, the slats 14 running in the Y direction also have full notches 26 which define a X-passthrough opening 28, through which passes the pair of laths 12, indicated exploded away from the opening in FIG. 7. The slats 14 also each have a half-notch 30, which is half the width of the full notch 22. The half-notches 30 are orthogonally related to the main notches 26 and are midway located in the full notch and define a pass through opening in the Z direction.

Finally, the post 16, extending in the Z direction, has a full notch 32. The other post '18, which is the "key" post, is not notched at all, but is a straight piece of square millstock.

The way in which the members fit together to form the joint is as follows: The laths 12 are inserted down through the opening 28 (or in actuality, the slats 14 are placed around the laths so that the opening 28 embraces the laths), so that the opening 24 defined by the laths extends down sufficiently below the opening 28 of the slats to permit the post 16 to be slid into the opening 24 beneath the slats 14. With the slats 14 compressed together, they are then fitted down into notch 32 of the post 16, so that the notch 32 embraces the two laths 14 and holds them together. The post 16 would then extend from the slats 14 as indicated in phantom in FIG. 7.

Thus, there is nothing left but a straight Z-passthrough opening for the "key" post 18 to fit into as shown in FIG. 7. Once the key post is in place, the slats 14 can no longer be raised to release the underlying post 16, and thus there is s locked, rigid orthogonal joint. Conversely, by slipping out the key post 18 (which in the preferred form of the invention makes a very tight press fit), the slats 14 can be lifted up out of the notch 32, to permit the post 16 to be slid longitudinally out of the opening 24, freeing the slats and laths to be separated.

Turning now to the overall construction, the matrix illustrated in FIG. 1 and 2 is formed from an X-directional parallel array of laths, a Y-directional parallel array of slats, and a Z-directional parallel array of posts.

There are only two type of cuts that need to be made in any of the structural members of the lattice. First, the full-sized notch cut, which is made in all the members except for the key post 18. Second the half-notch, which is made after the full-sized notch is made in the slats and in the post 16. With the proper jigs and tooling, obviously these cuts can be very simply and economically made.

The pieces used to construct the wine rack are illustrated in FIG. 10. For each length dimension, the lath has its exact counterpart as a slat. There are thus four of the large laths and slats, eight of the middle-sized laths and slats, and eight of the small laths and slats. And, as can be seen by counting the butt ends of the post from FIG. 1, there are seventeen of each of the posts 16 and 18. However, because the shortest laths are identical to the posts 16 in the wine rack example, there would just be a combined total of 25 of those.

In constructing the rack, although obviously it can be done by hand a simple way utilizing a framing jig involves first laying out all the laths (X direction) in place for the entire wine rack, possibly with the rack in its upright position as shown in FIG. 13. Then the slats 14 are all put in place, or put in place slightly displaced from their final position to permit the insertion of the posts 16. The, the posts 16 are slid in place and the respective slats 14 pressed into place in the notches 32 of the posts. Finally, nothing remains but to slide all seventeen of the key posts into place.

When the joint is completed, there is a void 34 which is defined by the bottom parts of the openings 28 and 24, beneath the solid key post 18 and between the sides of the slats 14 adjacent the half-notches. To eliminate this void, the slats could be cut as shown in FIG. 12, with the otherwise full-notch 22 instead being defined by an E-cut 36, which leaves a tongue of wood 38, two of which fill the void 34. This results in a somewhat stronger joint.

In addition to the E-cut 36 in the slat, there are other configurations which would result in the internal void being filled, which will not be expanded upon here.

In either of the embodiments illustrated, the wine rack of the instant disclosure, as indicated above, is very complex in its conception, at least for a wine rack, but is at the same time conceptually extremely simple in its implementation. When made from oak or other hardwood, it can be finely milled and finished to produce a very strong structure as well as a very attractive piece of furniture which appears to be of relatively intricate construction for the price. At the same time, it is extremely strong and durable, capable of loads, wall mounting, etc. The prototype wine rack, made of three-quarter inch nominal dimension soft wood, will withstand the full weight of a person standing on it without any sign of distortion or weakening. In fact, the construction is so strong that the same basic construction can be used to form structural members as described below.

By increasing the six of the members—for example, from three-fourths inch nominal stock in the model to six-inch or eight-inch square beams—large, strong cubicle frames or non-cube shaped box-like spaces, could be defined for an endless variety of uses,. FIG. 13 illustrated the basic modular cubic construction that would expand into a variety of useful lattice structures. The stock need not be square, but could be rectangular instead. Additionally, the cubes formed by the stock could be rectangular rather than cubic in two or three dimensions, or the cubic units could be parallelograms rather than cubic or rectangular. Although in some instance strength could be sacrificed, and the interchangability of the stock would be sacrificed, nonetheless for certain applications diamond-shaped or rectangular "cubes" might work out quite well.

By extending members of the six-piece orthogonal joint and then forming additional joints, all with common members, complex arrays can be created. If eight joints are used to form the orthogonal corners of a cube, then a very practical structure, with many potential uses is created. This cubic cell is rigidly bound together and a force applied to one member creates stresses which are shared by all members. By extending members and adding four joints, a second cubic cell can be formed alongside the first which shares four joints with the first cubic cell. Similarly, a third cubic cell can be formed by adding four joints and sharing four joints with the second cell.

Figure 15:
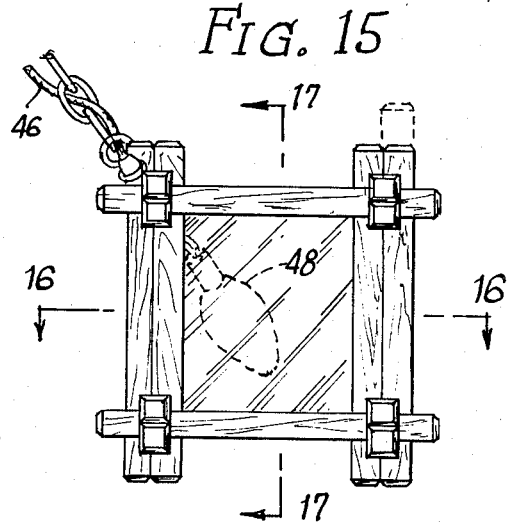
FIG. 15 is a side elevation view of the configuration of FIG. 14.
Figure 16:
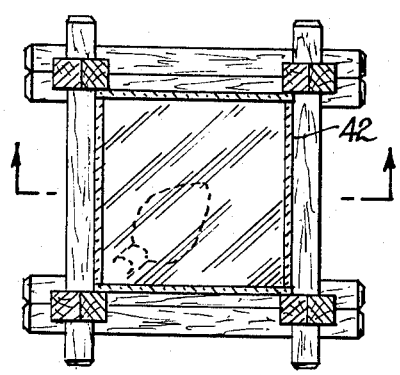
FIG. 16 is a section taken along line 16—16 of FIG. 15.
Figure 17:
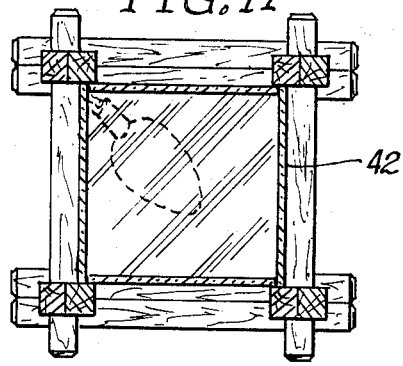
FIG. 17 is a section taken along line 17—17 of FIG. 15.
Figure 18:
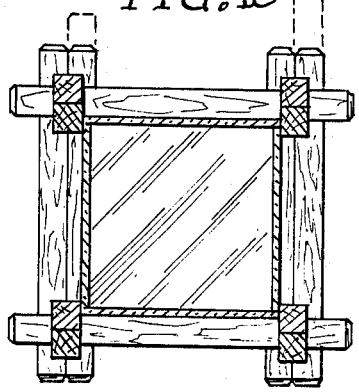
FIG. 18 is a section taken along line 18—18 of FIG. 15.

In this way, a beam can be formed with structural properties similar to a solid beam, but much lighter as illustrate in FIGS. 14 through 16. Thus, applications include assembly of high strength materials into cubic cell arrays and forming equivalent beams or truss-like formations for structural use where maximum strength with minimum weight is a design criterion. Another advantage is that the strength of these arrays is not dependent on conventional welding techniques currently used with today's materials. This permits the use of materials which are not adapted to welding techniques, such as certain tough plastics, to be made into beams and other strong multicellular configurations according to the instant disclosure.

Turning now to the drawings which specifically illustrate the invention of the instant application in which the frame is used to define an enclosure, FIG. 14 illustrates a cube made from a frame of elongated structural members. It is immaterial in the cube which is the X-, Y- and Z-direction.

Figures 19, 20:
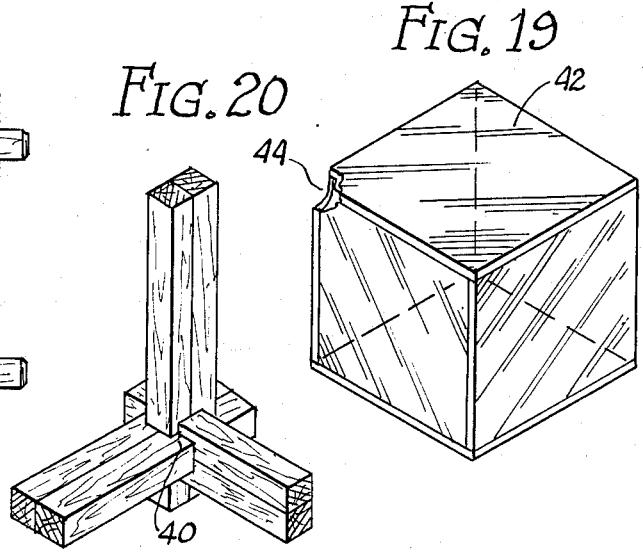
FIG. 19 is an isometric view of the glass panels of the instant invention.
FIG. 20 illustrates a typical inside corner of the invention.

In any event, at the inside of each of the joints is an inside corner 40, which is shown in detail in FIG. 20. The inside corners at each of the joints may not be exactly identical to the other inside corners, but it is substantially identical and is three-dimensional in that there is a face provided perpendicular to the X-, Y- and Z-directions so that each corner will neatly seat the three intersecting panels of glass 42 which may be assembled in these corners to define an enclosed cube, with six faces.

In the cubical version of the preferred embodiment, each four inside corners which together define a quadrilateral space which is perpendicular to an X-, Y- or Z-directional axis, forms a square. Nonetheless, ideally the panes 42 are not square in that if they are two panel thicknesses longer than they are wide, so that at the ends they overlap two orthogonal panes, and along the sides, they themselves are overlapped. This configuration enables all of the panes to hold themselves together, together with the inside corners, so that a complete cubical array is formed and the panels are positively held in place in a cubical configuration without the help of fasteners or adhesives.

An added feature is that no exposed butted end of any pane is visible outside the cube. All exposed butt ends, which are not covered by an orthogonal glass pane, are covered by one of the structure members.

Additionally, once the panes are all in place and frame is completely constructed, any of the panes can be removed by removing the one key structural member, of the kind having no notches, which is used to tie the frame together. Once this single member is removed, the pane just inside it may be removed, and access to the inside to change the bulb may be had, or, for that matter, all of the panes can then be removed one by one. Once reassembled with the key member replaced, again a positive lock of all the panes in place is achieved.

The enclosure as described herein can be used for a variety of different purposes, such as for furniture, aquariums, structures, etc. In the illustrated embodiment, which is a hanging lamp, a hole has been bored through one of the joints, not shown, and suitable stock is cut away from the panels as indicated at 44 in FIG. 19 to pass the wires 46 into the bulb fixture 48.

This disclosure, together with the co-pending application for a beam and the parent application for a wine rack, covers an exemplary variety of implementations of the invention, as a miscellaneous piece of furniture (in the parent application as a wine rack); as a structural member used for strength, which a lattice made of the instant construction can produce as illustrated in the application being filed simultaneously herewith, and, in the instant application, as an enclosure to be used for any of the purposes for which a four-sided enclosure are usable.

I claim:
1. An enclosure comprising:
  (a) a frame comprising:
    (i) reticulated lattice defining orthogonal X, Y, and Z directions;
    (ii) said lattice being comprised of a plurality of elongated structural members formed into an X-directional parallel array, a Y-directional parallel array, and a Z-directional parallel array;
    (iii) said parallel arrays intersecting one another to define joints between said elongated structural members and each of said joints including two of said members from each said X- Y-, and Z-directional parallel arrays to form said six-member joints, said six-member joints each having three elongated structural members that are only full notched, said full notch being substantially equal to two times the cross-sectional area of each of the three elongated members, two of said members having similar full notches and also having an additional half notch, said half notch being formed at 90 degrees to the full notch and substantially at mid-span of the full notch, the sixth elongated structural member having no notches at said joint and being the key post that holds the remaining five members together as a joint; and,
    (iv) each of said joints comprising an interlocking joint held together by the interlocking configurations of the elongated structural members themselves without the use of blocks or sockets at the joints or the use of fasteners or glue at any of the joints;

(b) each of said joints defining a three dimensional inside corner such that six planes orthogonal to said X, Y, or Z directions are defined which also intersect four of said corners to define six quadrilateral spaces; and (c) at least four panels occupying four of said quadrilateral spaces and held in place, at least in part, by said three-dimensional inside corners.

2. Structure according to claim 1 wherein each of said elongated structural members is paired with another contiguous structural member to define structural member pairs.

3. Structure according to claim 2 wherein each of the elongated structural members in said X-directional array comprise a lath and each lath is one of said elongated members which has a full notch at each joint with the notches facing one another to define a Z-passthrough opening.

4. Structure according to claim 3 wherein each of the elongated structural members in said Y-directional array comprises a slat and each slat has a full notch at each joint with the notches of the slats facing each other to define an X-passthrough opening, and said laths pass through said openings.

5. Structure according to claim 4 wherein each said slats has a half-notch cut centrally orthogonally in the side of each of the notches thereof, and said half-notches define Z-passthrough openings, and each of the elongated structural members of the elongated structural member pairs of the Z-directional array comprises a post, a first one of the posts in each pair having a full notch at each joint defining a wide passthrough opening embracing two of said slats in alignment with the half-notches thereof, and the second post of each pair being a key post with no notches, inserted into the joints last to rigidly tie the respective joint together.

6. Structure according to claim 5 wherein some of said elongated structural members having notches therein have additional stock left in the notches to fill the void that would otherwise lie internally of each joint so that a totally solid joint is produced.

7. Structure according to claim 6 wherein each of said full notches in each of said slats is E-shaped to define said additional stock to fill the void that would otherwise be produced.

8. Structure according to claim 2 wherein each of said elongated structural members has a joint region and each of said joint regions has cut into it either no notch at all, a full notch, or a full notch with an orthogonal half-notch centrally cut into the side thereof, such that all of said elongated structural members have only one of the above-stated three configurations at the joint region.

9. Structure according to claim 6 wherein the elongated structural members of the X-dimensional array are all laths with a full notch at the joint region, all the elongated structural members of the Y-dimensional array are slats having at their joint region a full notch having a half-notch centrally cut into its side, and each pair of elongated structural members in the Z-dimensional array comprises both a first post with a full notch at the joint region and a second post with no notches at all.

10. Structure according to claim 1 wherein in all the directions of said lattice is substantially equi-dimensional.

11. Structure according to claim 1 wherein in addition to said four panels occupying four of said quadrilateral spaces there are two additional panels occupying the remaining two quadrilateral spaces so that a complete six-sided enclosure is formed.

12. Structure according to claim 11 wherein said frame is dimensioned and shaped such that said quadrilateral spaces are substantially identical and said panels substantially define a cube.

13. Structure according to claim 12 wherein each of said panels is identical to each of the other panels, with each panel being substantially two panel thicknesses longer than it is wide, and said panels are arranged such that each panel overlaps two other panel edges with its respective ends, and is in turn overlapped by two other panels at its respective sides so that all six of said panels are positively held in place by a combination of said three-dimensional inside corners and other panels.

14. Structure according to claim 1 wherein said enclosure comprises at least part of a lamp, said panels are at least translucent, and including a light bulb operatively mounted within said frame.

15. Structure according to claim 14 wherein there are six panels altogether occupying all six quadrilateral spaces, and one corner of said enclosure is bored and passes power wires therethrough which is operatively connected to said bulb to energize same.

* * * * *